United States Patent [19]

Blount

[11] 3,952,320
[45] Apr. 20, 1976

[54] MULTIPLE FLASH LAMP UNIT

[75] Inventor: Richard Blount, South Euclid, Ohio

[73] Assignee: General Electric Company, Schenectady, N.Y.

[22] Filed: July 3, 1974

[21] Appl. No.: 485,459

[52] U.S. Cl.................................. 354/126; 240/1.3; 317/101 CC; 339/17 R
[51] Int. Cl.²........................................ G03B 15/02
[58] Field of Search.................... 354/126, 127, 148; 240/1.3; 431/92, 93, 95 R, 95 A; 339/17 R; 317/101 CC, 101 DH, 101 F; 174/68.5

[56] References Cited
UNITED STATES PATENTS

| | | | |
|---|---|---|---|
| 3,473,880 | 10/1969 | Wick | 240/1.3 X |
| 3,568,129 | 3/1971 | Gold et al. | 317/101 CC X |
| 3,583,304 | 6/1971 | Brandt | 240/1.3 X |
| 3,598,985 | 8/1971 | Harnden et al. | 240/1.3 |
| 3,608,451 | 9/1971 | Kelem | 240/1.3 X |
| 3,619,590 | 11/1971 | Meulemans et al. | 240/1.3 |
| 3,710,704 | 1/1973 | Wagner | 240/1.3 |
| 3,836,824 | 9/1974 | Watrous | 317/101 F |

*Primary Examiner*—Fred L. Braun
*Attorney, Agent, or Firm*—Norman C. Fulmer; Lawrence R. Kempton; Frank L. Neuhauser

[57] ABSTRACT

A multiple photoflash lamp unit is connectable to a camera in different orientations, and the lamps and electrical circuit are arranged so that in the different orientations of the unit a different group of the lamps can be flashed. A connector circuit arrangement electrically shorts the circuitry of the remaining lamps so they cannot be accidentally flashed.

7 Claims, 4 Drawing Figures

FIRING PULSE SOURCE

MULTIPLE FLASH LAMP UNIT

CROSS-REFERENCES TO RELATED APPLICATIONS

Ser. No. 448,671, filed Mar. 6, 1974, Kurt H. Weber, "Multiple Flash Lamp Unit," assigned the same as this invention.

Ser. No. 485,422, filed concurrently herewith, Paul T. Coté, "Multiple Flash Lamp Unit," assigned the same as this invention.

Ser. No. 485,460, filed concurrently herewith, Paul T. Coté, "Protective Terminal for Multiple Flash Lamp Unit," assigned the same as this invention.

BACKGROUND OF THE INVENTION

The invention is in the field of multiple photoflash lamp units, such as flashcubes and planar arrays of the type which are adapted to be temporarily attached to a camera in different orientations and which are arranged so that different groups of lamps will be flashed (usually one lamp at a time) in the different orientations of the unit.

U.S. Pat. Nos. 3,598,984 to Stanley Slomski and 3,598,985 to John Harnden and William Kornrumpf disclose a dual-sided flash array having first and second groups of flash lamps and reflectors facing in mutually opposite directions. The array is plugged into the camera whereby the first group of lamps faces frontwardly and is connected for the lamps of that group to be flashed. When these lamps have been flashed, the array is turned around and the lamps of the second group face frontwardly and are connected to be flashed.

The above-referenced patent application of Kurt Weber discloses a multiple flash lamp unit that can be connected to a camera in different orientations in each of which a different group of the flash lamps is relatively farther from the camera lens axis than are the other lamps of the unit. The lamps and electrical circuitry are arranged so that in any of the orientations of the unit with respect to the camera, only the group of lamps relatively farther from the lens axis can be flashed. The concept can be employed in various forms of multiple flash units, such as a double-deck rotatable flash "cube" having connector plugs at each end, or a planar array having a pair of oppositely disposed connector means. The purpose of such an arrangement is to position the "active" group of flash lamps farther above the camera lens, in order to reduce the possibility of a "red-eye" effect that causes the pupils of a person's eyes to appear red or pink in flash pictures taken when the flash lamp is close to the camera lens.

In multiple flash units having such groups of lamps, and especially in units employing high voltage lamps which are flashed by a high voltage pulse (1,000 or 2,000 volts, for example) of low current and energy, there is some possibility that when a firing pulse is applied to the active lamp circuit, sufficient pulse energy may be coupled to the inactive lamp circuit (via stray capacitance in the circuitry, for example) to undesirably flash an inactive lamp in addition to an active lamp.

SUMMARY OF THE INVENTION

Objects of the invention are to provide an improved multiple flash lamp unit of the type that is connectable to a camera in different orientations for firing different groups of lamps; to provide means for preventing accidental flashing of a lamp in an inactive group of lamps when a firing pulse is applied to an active group of lamps; and to provide such accidental flash prevention in a manner that is feasible and economical to manufacture.

The invention comprises, briefly and in a preferred embodiment, a multiple flash lamp unit of the type that is connectable to a camera or flash adapter in different orientations and having electrically flashed lamps and circuit connections for causing different groups of lamps to be connected so they can be flashed in the different orientations, and connector means for electrically shorting the circuitry of the lamps that are not to be flashed in each orientation. This prevents accidental or spurious flashing of lamps that are not intended to be flashed.

In a specific preferred embodiment, an elongated one-sided planar flash array is provided with a pair of connectors respectively at opposite ends thereof, and electrical terminals at each connector are connected to a group of lamps relatively farthest from that connector, as disclosed in the above-referenced Weber patent application, so that the "active" group of lamps will be relatively farthest from the camera's optical axis, thus reducing the possibility of the above-described undesirable red-eye effect. In accordance with the present invention, additional terminal means are provided at each connector and are connected to the circuitry of the nearest (and inactive) group of flash lamps, and contactor means in the socket of the camera or adapter electrically shorts the additional terminal means thereby electrically shorting the circuitry of the inactive group of lamps and preventing them from accidentally flashing in response to firing pulses applied to the active group of lamps.

The invention is particularly effective and desirable for multiple flash units employing high voltage flash lamps which require relatively little current for causing them to flash, so that when a high voltage firing pulse is applied to the active group of lamps, there is a possibility of sufficient pulse energy being capacitively coupled to the inactive lamp circuit for causing one or more of them to undesirably flash, were it not for the inactive lamp circuit being electrically shorted in accordance with the invention.

DESCRIPTION OF THE PREFERRED EMBODIMENT

Figure 1:
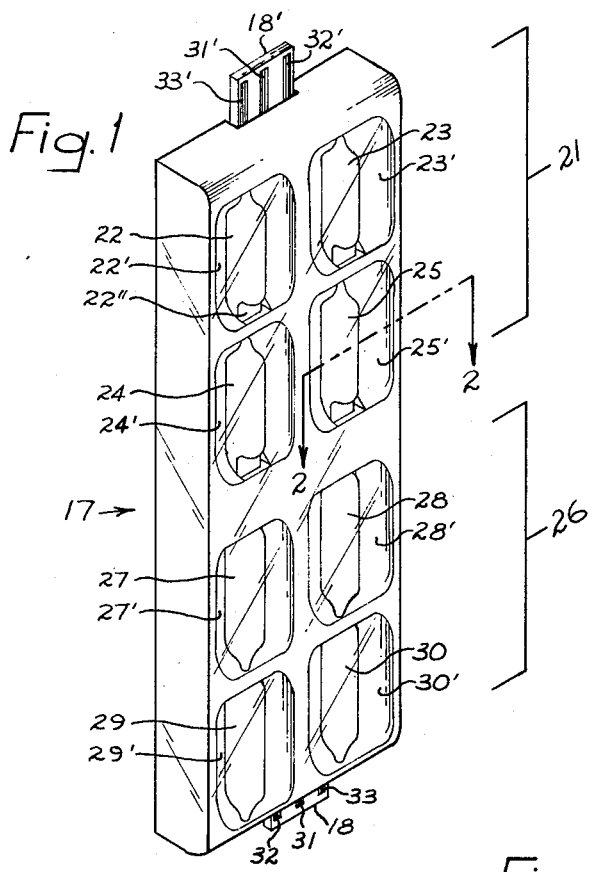
FIG. 1 is a perspective view of a multiple flash lamp unit in accordance with a preferred embodiment of the invention.

A multiple flash lamp unit 17, shown as being of the planar array type and containing a plurality of electrically fired flash lamps, is provided with a plug-in connector tab 18 at the lower side or end thereof, adapted to fit into a coupler such as a socket 19 (FIG. 3) of a camera or flash adapter. The lamp array 17 is provided with a second plug-in connector tab 18' at the top side or end thereof, whereby the array 17 is adapted to be attached to the socket 19 in either of two orientations, i.e., with either the tab 18 or the tab 18' plugged into the socket 19. The array 17 is provided with an upper group 21 of flash lamps 22, 23, 24, and 25, and a lower group 26 of flash lamps 27, 28, 29, and 30. Reflectors 22', etc., are disposed behind the respective flash lamps, so that as each lamp is flashed, its light is projected forwardly of the array 17. The relationship of each reflector to its associated lamp, and a suitable plastic housing and transparent front cover, may be generally that as is disclosed in the above-referenced planar array patents.

Figure 3:
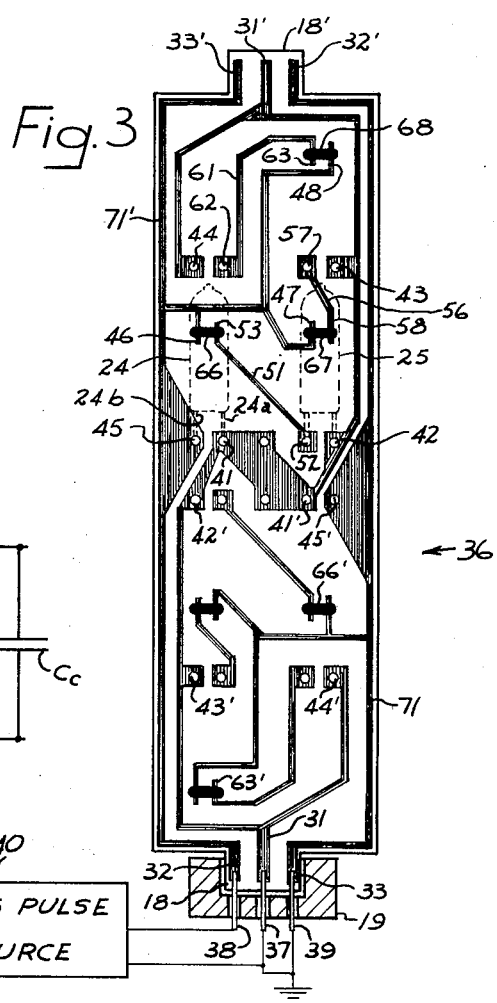
FIG. 3 is a front view of a circuit board to which flash lamps are connected in the multiple lamp unit, shown plugged into a socket.

With the array 17 oriented and plugged into the socket 19 as shown in FIG. 3, only the upper four lamps of the array, which constitute the upper group 21, can be flashed, and the four lamps of the lower group 26 are made inactive and will not flash. Thus, the above-described undesirable red-eye effect is reduced or eliminated, since the only lamps of the array that can flash are grouped relatively far from the socket 19 and hence from the axis of the camera's lens. The array 17 can be removed from the socket 19, either before or after all lamps of the upper group 21 have been flashed, and turned around, with the upper tab 18' now the lower tab which is inserted into the socket 19, whereupon the group 26 of lamps becomes the upper group, and its lamps are flashed, again reducing or eliminating the red-eye effect because the active lamps are relatively farthest from the socket 19 and hence from the axis of the camera's lens.

Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab for connecting the upper or active group of lamps to the socket 19. Thus, tab 18 is provided with a pair of electrical terminals 31 and 32, and the tab 18' is provided with a pair of terminals 31' and 32'. In accordance with the invention, each of the connector tabs 18 and 18' is provided with an additional connector terminal 33 and 33' respectively connected to the circuitry of the groups 26 and 21 of lamps for shorting the inactive lamp group circuitry when the unit is connected to the socket 19, as will be described more fully.

FIG. 3 shows a circuit board 36 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The top and bottom halves of the printed circuitry are reverse mirror images of each other in this embodiment, but this is not necessary.

The camera socket 19 for the flash unit 17 is provided with a pair of contacts 37 and 38 which respectively electrically engage the terminals 31 and 32 (or 31' and 32') of the flash unit when it is plugged into the socket 19. An additional contact 39 is electrically connected to contact 37, and engages the terminal 33 (or 33') of the flash unit.

A firing pulse source 40, which may be contained within a camera or flash adapter, is connected to the contacts 37 and 38 of the socket 19. The type of firing pulse produced by the source 40 and applied across the contacts 37 and 38 will of course depend on the type of lamps used in the flash unit 17. If low voltage filament types of flash lamps are employed in the unit 17, the firing pulse source 40 may be a battery or battery-capacitor discharge type, producing, in synchronization with opening of the camera shutter, a pulse of approximately 3 to 15 volts or more and of sufficient energy to fire a single flash lamp. An example of a low voltage flash lamp is disclosed in U.S. Pat. No. 3,506,385 to Kurt Weber and George Cressman, and an example of a low voltage flash sequencing circuit is disclosed in U.S. Pat. No. 3,532,931 to Paul Coté and John Harnden. If the flash lamps in the multiple flash unit 17 are of the so-called high voltage type, requiring a pulse of more than 100 volts, for example 1,000 or 2,000 volts or more, the firing pulse source 40 may comprise a suitable battery-capacitor discharge and voltage step-up transformer type of circuit, or may employ a compact piezoelectric element arranged to be impacted or stressed in synchronization with opening of the camera shutter, so as to produce a firing pulse having a voltage of approximately 1,000 or 2,000 volts or more and of sufficient energy to fire a single flash lamp. An example of high voltage flash lamp and a firing pulse source comprising a piezoelectric element synchronized with a camera shutter is described in U.S. Pat. Nos. 2,972,937 and 3,106,080, both to C. G. Suits.

The circuit board 36 in FIG. 3 is shown in the orientation in which the connector tab 18 faces downwardly and is plugged into the socket 19, whereby the circuit board terminals 31 and 32 respectively make electrical contact with the socket contacts 37 and 38. The circuit board terminal 31 is part of a continuous conductor run on the board, which is connected in common to one electrical lead wire (22a, 23a, 24a, etc.) of each of the eight flash lamps 22, 23, 24, etc., in the unit at points 41, 42, 43, 44, etc., by suitable means such as soldering, welding, staking, or crimping. For the sake of clarity, only two flash lamps 24 and 25 are shown in FIG. 3, and in dashed lines. Suitable openings are provided through the reflectors at the bases of the lamps to permit the connections of the lead-in wires to the circuit board.

The circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected to the remaining lead wire of flash lamp 25 at 52, and terminates at a radiation switch terminal 53 which is near to but spaced from radiation switch terminal 46. A circuit board conductor run 56 is connected to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Figure 2:
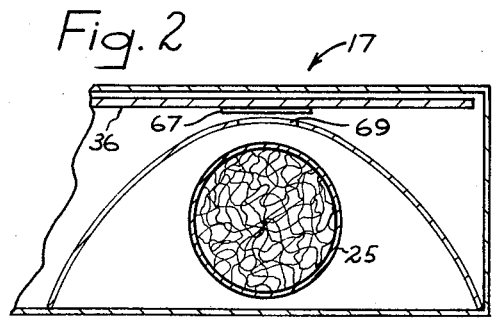
FIG. 2 is a cross-sectional view of a portion of FIG. 1, taken on the line 2—2 thereof.

Radiation-activated switches 66, 67, and 68 are respectively positioned to be in contact with and bridge across the respective pairs of switch terminals 46–53, 47–58, and 48–63. The material for the radiation switches 66, 67, and 68 may be suitable material initially having an open circuit or high resistance, the resistance thereof becoming zero or a low value when the material receives radiation in the form of heat and/or light from a respective adjacent lamp, upon the lamp being flashed. For this purpose, each of the radiation-activated switches 66, 67, and 68 is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches 66–68 is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image layout of the same components shown in the upper part of the circuit board, and therefore will not be described in detail. That is, the reverse mirror image relationship exists about an imaginary central line midway between the upper and lower ends of the board. It will be noted that the circuit runs from the plugged-in terminals 31 and 32 at the lower part of the circuit board extend upwardly so as to activate the circuitry in the upper half of the circuit board. Similarly, when the unit is turned around the tab 18' is plugged into the socket 16, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

In accordance with the invention, the additional terminal 33 on the plug-in tab 18 is connected, via printed circuit run 71, to the connection point 45' for lamp 28, which is the first lamp to be flashed when the array is turned around so that terminals 31' and 32' are connected to the firing pulse source 40 via the socket 19. Since the socket contactors 37 and 39 are electrically shorted together, they electrically short together the tab terminals 31 and 33, also at the same time shorting terminals 31' and 32' of the inactive lower group of lamps, thus electrically shorting the input of the circuitry for the inactive group of lamps. Similarly, when the unit is turned around, the socket contactors 37 and 39 will electrically short the terminals 31' and 33' and also terminals 31 and 32, thus shorting the input of the then inactive lamp circuit. As has been mentioned, this shorting of the inactive lamp circuit prevents accidental flashing of an inactive lamp by stray capacitive coupling of a firing pulse. Of course, this precaution is useful only when the inactive lamps have not yet been flashed, and is not necessary if they have already been flashed.

The circuit of FIG. 3 functions as follows. Assuming that none of the four lamps in the upper half of the unit 17 have been flashed, upon occurrence of a first firing pulse from the source 40, this pulse will be directly applied to the lead-in wires of the first flash lamp 24, whereupon the lamp 24 flashes and becomes an open circuit between its lead-in wires. Heat and/or light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' attached to the socket 16, the group of lamps that then become uppermost and relatively farthest away from the lens axis will be in an active circuit and will be flashed in the same manner as has been described.

Another type of sequencing circuit that could be used employs switches that are initially closed to become open circuits in response to flashing of an adjacent lamp, the lamps being a type that is a short circuit or low resistance between the lead-in wires after flashing. Other types of switching, such as those employing mechanical, current, or voltage actuated switches, can be used instead of radiation switches.

Figure 4:
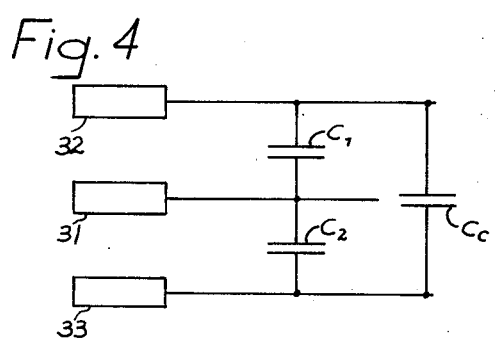
FIG. 4 is a schematic diagram of stray capacitances in the circuitry of the unit.

FIG. 4 is a schematic diagram of the circuit stray capacitances among the connector terminals 31, 32, and 33. $C_1$ and $C_2$ are the stray capacitances between the common terminal 31 and the terminals 32 and 33, respectively, and $C_c$ is the stray capacitance between terminals 32 and 33. $C_1$ and $C_2$ are the sum of capacitances between the circuit board conductor runs connected to the terminals, plus the capacitances of flash lamps connected, both directly and through radiation switches that have been actuated, across the respective terminals. Thus, in the preferred embodiment shown, the capacitance values of $C_1$ and $C_2$ initially will be approximately equal, and each will increase slightly as lamps become flashed in its respective circuit.

When a firing pulse is applied across terminals 31 and 32 for the purpose of flashing a lamp in the first group of lamps, alternating frequency components thereof will be coupled through stray capacitance $C_c$ to the terminal 33, and part of this voltage will be applied across a lamp in the second group of lamps (assuming, for the moment, that terminal 33 is not shorted to the common terminal 31), the capacitances $C_c$ and $C_2$ acting as a voltage divider. This voltage that would be coupled to a lamp in the second group will have a value of $C_c$ divided by $(C_c+C_2)$ of the voltage applied across terminals 31 and 32. Thus, if the value of $C_c$ is half that of each of $C_1$ and $C_2$, then the alternating voltage coupled across terminals 31 and 33 via capacitor $C_c$ will be one-third that of the alternating voltage firing pulse components applied across terminals 31 and 32. If the firing pulse source 40 is a piezoelectric element, as described above, the firing pulse produced by it when impacted or stressed consists almost entirely of alternating voltage, in the form of a damped-wave alternating voltage, having a frequency of 200 KHz, for example, or some other frequency, depending on the characteristics of the element. Thus, in a particular example, if the capacity of $C_c$ is 5 picofarads and that of each of $C_1$ and $C_2$ is 10 picofarads, and if the lamps in the unit have firing voltage breakdown values varying over a range of 3:1, and if the lamp intended to be flashed (connected across terminals 31 and 32) has a breakdown voltage at the high end of the range (1,800 volts, for example) and the lamp connected at the time in the inactive group of lamps (across terminals 31 and 33) has a breakdown voltage at the low end of the range (600 volts or less, for example), then when a firing pulse of 1,800 volts or more is applied across terminals 31 and 32, the intended lamp will flash at 1,800 volts, and the lamp in the inactive group is likely to be undesirably flashed by the 600 volts (one-third of 1,800) coupled to it via capacitance $C_c$. However, this is prevented due to the shorting of terminals 31 and 33 in accordance with the invention.

It has been found that the invention achieves its objectives of providing a multiple flash unit of the type having active and inactive groups of lamps in different orientations of the unit, in which there is substantially no likelihood of an inactive lamp being accidentally flashed by a firing pulse, and which is readily manufacturable at reasonable cost.

While a preferred embodiment of the invention has been shown and described, various other embodiments and modifications thereof will become apparent to persons skilled in the art, and will fall within the scope of the invention as defined in the following claims; for example, the invention can have various geometries and be embodied in the form of stacked double-decked flashcubes, and can be applied to other planar array configurations, such as dual-sided arrays, and to multiple flash lamp units which may have more than the two operable orientations that have been specifically described. The term "camera" as used herein is intended to include a flash adapter device for a camera.

What I claim as new and desire to secure by letters patent of the United States is:

1. Photoflash apparatus comprising a selectively actuatable firing pulse source, a coupler having first and second contacts connected electrically to said firing pulse source and having a third contact shorted electrically to said second contact, a flash lamp unit having first and second photoflash lamps, wherein said flash lamp unit is characterized by first and second connectors adapted to be joined removably and alternatively with said coupler, each of said connectors having first, second and third terminals located to electrically engage said first, second and third coupler contacts, respectively, when that connector and said coupler are joined, and means for electrically connecting said first lamp across the first and second terminals of said first connector and across the second and third terminals of said second connector and for electrically connecting said second lamp across the first and second terminals of said second connector and across the second and third terminals of said first connector thereby to cause one of said lamps to be electrically connected across said firing pulse source and to cause the other of said lamps to be electrically shorted across said second and third contacts when either of said connectors is joined with said coupler.

2. Photoflash apparatus as claimed in claim 1, in which the three terminals of each connector are arranged in a row across that connector, each of said second terminals being positioned between the adjacent first and third terminals.

3. A circuit board for a planar flash array, comprising an elongated circuit board member having first and second connector tabs respectively at the ends thereof, a first pair of flash lamp connection areas on said circuit board member on a first half thereof that is nearest said first tab, a second pair of flash lamp connection areas on said circuit board member on a second half thereof that is nearest said second tab, a first circuit run extending along said circuit board member from said first tab to said second tab and electrically connected to one lamp connection area of said second pair of areas, a second circuit run extending along said circuit board member from said second tab to said first tab and electrically connected to one lamp connection area of said first pair of areas, and a third circuit run extending along said circuit board member from said first tab to said second tab and electrically connected to the remaining lamp connection area of each of said pairs of areas.

4. A circuit board as claimed in claim 3, in which said third circuit run is positioned between the other two circuit runs in the area of each of said first and second tabs.

5. A circuit board for a planar flash array and comprising an elongated circuit board member having first and second connector tabs respectively at the ends thereof, first and second pairs of flash lamp connection areas on said circuit board member, at least three spaced terminals on each of said tabs, a first circuit run on said circuit board member for electrically connecting one lamp connection area of said first pair to a first one of said terminals on said first tab and to a first one of said terminals on said second tab, a second circuit run on said circuit board member for electrically connecting one lamp connection area of said second pair to a second one of said terminals on said first tab and to a second one of said terminals on said second tab, and circuit run means on said circuit board member for electrically connecting the remaining lamp connection area of each of said pairs to the third one of said terminals disposed respectively on said first and second tabs.

6. A circuit board as claimed in claim 5, in which said circuit run means is constituted by a single circuit run which is connected electrically to said remaining lamp connection area of each of said pairs of areas and to said third terminal on said first tab and said third terminal on said second tab.

7. A circuit board as set forth in claim 5, further characterized in that said lamp connection areas, said circuit runs, and said terminals are disposed on said circuit board member substantially in a reverse mirror image layout on opposite sides of a central line midway between said ends of said member.

\* \* \* \* \*